US010293290B2

(12) United States Patent
Demmel et al.

(10) Patent No.: US 10,293,290 B2
(45) Date of Patent: May 21, 2019

(54) FLAME-RETARDANT GAS FILTER MATERIAL HAVING HIGH DUST STORAGE CAPACITY

(71) Applicant: NEENAH GESSNER GMBH, Bruckmuehl (DE)

(72) Inventors: Andreas Demmel, Feldkirchen-Westerham (DE); Werner Hoerl, Feldkirchen-Westerham (DE)

(73) Assignee: NEENAH GESSNER GMBH, Bruckmuehl (DE)

( * ) Notice: Subject to any disclaimer, the term of this patent is extended or adjusted under 35 U.S.C. 154(b) by 90 days.

(21) Appl. No.: 14/441,930

(22) PCT Filed: Sep. 24, 2013

(86) PCT No.: PCT/EP2013/069802
§ 371 (c)(1),
(2) Date: May 11, 2015

(87) PCT Pub. No.: WO2014/072117
PCT Pub. Date: May 15, 2014

(65) Prior Publication Data
US 2015/0273372 A1  Oct. 1, 2015

(30) Foreign Application Priority Data

Nov. 12, 2012  (DE) .......... 10 2012 220 546

(51) Int. Cl.
| | | |
|---|---|---|
| *B01D 53/02* | (2006.01) | |
| *B01D 39/16* | (2006.01) | |
| *B01D 39/18* | (2006.01) | |
| *B01D 46/00* | (2006.01) | |
| *F02M 35/024* | (2006.01) | |

(52) U.S. Cl.
CPC ....... *B01D 39/1623* (2013.01); *B01D 39/163* (2013.01); *B01D 39/18* (2013.01); *B01D 46/0023* (2013.01); *F02M 35/02458* (2013.01); *B01D 2239/0457* (2013.01); *B01D 2239/0478* (2013.01); *B01D 2239/086* (2013.01)

(58) Field of Classification Search
CPC ..... B01D 39/18; B01D 39/1623; B01D 46/23
See application file for complete search history.

(56) References Cited

U.S. PATENT DOCUMENTS

| | | | | |
|---|---|---|---|---|
| 3,017,239 | A * | 1/1962 | Rodman ............ | B01D 39/1615 |
| | | | | 55/524 |
| 3,171,820 | A | 3/1965 | Volz | |
| 3,692,618 | A | 9/1972 | Dorschner et al. | |
| 3,802,817 | A | 4/1974 | Matsuki et al. | |
| 3,855,046 | A | 12/1974 | Hansen et al. | |
| 4,119,543 | A * | 10/1978 | Lawson ............ | B01D 39/14 |
| | | | | 210/496 |
| 4,161,422 | A | 7/1979 | Lawson et al. | |
| 4,340,563 | A | 7/1982 | Appel et al. | |
| 4,902,563 | A | 2/1990 | McCullough, Jr. et al. | |
| 7,196,217 | B2 | 3/2007 | Schliephake et al. | |
| 7,918,313 | B2 | 4/2011 | Gross et al. | |
| 2008/0022645 | A1* | 1/2008 | Skirius ............ | A47C 31/007 |
| | | | | 55/524 |
| 2010/0139224 | A1* | 6/2010 | Lim ............ | B01D 39/163 |
| | | | | 55/486 |
| 2014/0319706 | A1* | 10/2014 | Huizing ............ | B01D 53/228 |
| | | | | 261/102 |

FOREIGN PATENT DOCUMENTS

| | | |
|---|---|---|
| CN | 1284007 A | 2/2001 |
| CN | 202410383 A | 9/2012 |
| DE | 601435 A | 8/1934 |
| DE | 1504551 B | 5/1969 |
| DE | 2723528 A1 | 12/1977 |
| DE | 19752143 A1 | 5/1999 |
| DE | 202 15 233 U1 | 1/2003 |
| DE | 103 60 396 A1 | 7/2005 |
| DE | 10 2009 006 583 A1 | 6/2010 |
| DE | 20 2009 010 806 U1 | 8/2010 |
| DE | 20 2012 005 183 U1 | 11/2012 |
| EP | 2206544 A1 | 7/2010 |
| GB | 1111928 | 5/1968 |
| GB | 1406431 | 9/1975 |
| JP | H0394808 A | 4/1991 |
| JP | H11-169619 A | 6/1999 |
| JP | 2001137627 A | 5/2001 |
| JP | 2001172863 A | 6/2001 |
| JP | 2003080014 A | 3/2003 |
| JP | 2006122738 A | 5/2006 |
| JP | 2007-130632 A | 5/2007 |
| JP | 2008-013858 A | 1/2008 |
| JP | 2008-279442 A | 11/2008 |
| JP | 2009185396 A | 8/2009 |

OTHER PUBLICATIONS

Korean Office Action dated Apr. 18, 2016 relative to corresponding Korean Patent Appln. No. 10-2015-7012538.
Wente, V.A., "Superfine Thermoplastic Fibers", Industrial and Engineering Chemistry, vol. 48, No. 8, Aug. 1956, Naval Research Laboratory, Washington 25, D.C., pp. 1342-1346.
International Search Report dated Mar. 3, 2014 issued in PCT/EP2013/069802.
www.erba.ch/content_flammen/detail1.html (accessed Dec. 20, 2016).
Abridged translation of Japanese Office Action dated Jul. 15, 2016 issued in corresponding Japanese Patent Appln. No. 2015-541051.

* cited by examiner

*Primary Examiner* — Christopher P Jones
(74) *Attorney, Agent, or Firm* — Scully Scott Murphy and Presser

(57) ABSTRACT

The invention relates to a filter material impregnated on one side with a binding agent that is in particular suited for gas filtration, wherein the filter material comprises a side that is not impregnated with a binding agent, which side contains a halogen-free and boron-free flame protection means. By means of the filter material according to the invention, a high separation rate and a high dust storage capacity are achieved, whereas the filter material is flame-retardant, and in the event of fire, does not release any toxic decomposition products. The invention further relates to a filter element comprising the filter material according to the invention.

20 Claims, No Drawings

FLAME-RETARDANT GAS FILTER MATERIAL HAVING HIGH DUST STORAGE CAPACITY

The invention relates to a flame-retardant filter material having high dust storage capacity, which is particularly suited for the separation of liquid and solid contaminations from gases.

PRIOR ART

The use of flame-retardant filter materials for filtering gases is becoming increasingly more important in most fields of gas filtration. In most automobiles, the air filter materials for filtration of combustion air already contain a flame retardant so that, for example, a sucked-in, still burning cigarette cannot cause a car fire. However, flame-retardant filter materials also play an important role in the domestic sphere, such as in the filtration of intake air in air conditioners or in extractor hoods above cooking areas.

Flame-retardant filter materials have been known for a long time. One possibility of producing flame-retardant filter materials is an appropriate selection of non-flammable raw materials, such as, for example, halogenated fibers, inorganic fibers, ceramic particles for sinter filters or synthetic fibers in which a flame protection means is already incorporated. An air filter medium from halogenated fibers is known, for example, from GB 1406431 A.

Another possibility is a subsequent flame-retardant treatment of the finished filter material. This variant is often more cost-efficient and allows the use of significantly more, various raw materials for the production of the filter material. Since many filter materials are also impregnated with a synthetic resin solution or dispersion to improve stiffness, strength and resistance, the flame protection means is usually incorporated into the impregnating agent. Due to this, the flame protection means is not washed out as easily from the filter material as a separately applied flame protection means even after prolonged contact with moist or wet gas. Given that most flame protection means in the dry state are available in the form of particles which do not bond permanently with the filter material, they can be bound to the filter material by the impregnating agent. Flame protection means that are suitable to be added to the usual impregnating agents are, for example, halogenated organic compounds, silicones, phosphorous compounds, nitrogenous compounds, boracic compounds, metal oxides, metal hydrates and graphite. One example of a filter material having a flame-retardant impregnation is the filter material L4-6i27SGF2 of NEENAH Gessner, Bruckmühl. For many years, this filter material has proved to be successful worldwide as an air filter material for the intake air of internal combustion engines.

The dust storage capacity of fully impregnated filter materials no longer suffices for many applications. One possibility to increase the dust storage capacity of impregnated filter materials is a one-sided application of an impregnating agent. The advantage of these filter materials is their very open surface and, hence, very high dust storage capacity of the non-impregnated side and its strength, stiffness and resistance by the impregnated side. The use of one-sided impregnated filter materials has been known for a long time and is described, for example, in a preferred embodiment in DE 19752143 A1.

However, these filter materials have the disadvantage that the non-impregnated side is not flame-retardant, especially when cellulose or synthetic fibers are used as raw material. Therefore, an attempt was made to equip these filter materials also with a flame retardant.

The incorporation of halogenated or boracic flame protection means into the impregnation has a flame-retardant effect on the entire filter material, thus also on the non-impregnated side. However, if there is a fire, halogenated and boracic substances release toxic decomposition products and are thus not desirable.

There is therefore an urgent need for a filter material with high separation efficiency, high dust storage capacity and a flame-retardant effect, without releasing toxic decomposition products if there is a fire.

SUMMARY OF THE INVENTION

The object is solved according to the invention by a filter material which is impregnated on one side with binding agents and which comprises a side not impregnated with a binding agent, and this side contains a halogen-free and boron-free flame protection means.

DETAILED DESCRIPTION OF THE INVENTION

The filter material according to the invention comprises preferably at least one material selected from the group consisting of wet-laid nonwovens, dry-laid nonwovens, fabrics and foams.

The dry-laid nonwovens are to be understood, inter alia, as dry-laid fiber nonwovens, meltblown nonwovens and spunbonded nonwovens.

Dry-laid fiber nonwovens consist of fibers of finite length. Both natural and synthetic fibers can be used for the production of dry-laid fiber nonwovens. Examples of natural fibers are cellulose, wool, cotton and flax. Synthetic fibers are, for example, polyolefin fibers, polyester fibers, polyamide fibers, polytetrafluoroethylene fibers and polyphenylene sulfide fibers. The fibers used can be either straight or crimped. The dry-laid fiber nonwovens can also be airlaid fiber nonwovens. For solidification, the dry-laid fiber nonwoven can contain one- or multicomponent melt bonding fibers which, at a temperature below the melting temperature, melt the other fibers in their entirety or in part and solidify the nonwoven. The production of dry-laid fiber nonwovens is carried out in accordance with the known prior art, as described in the book "Vliesstoffe" by W. Albrecht, H. Fuchs, W. Kittelmann, Wiley-VCH, 2000. The dry-laid fiber nonwovens can be solidified by the above-mentioned one- or multicomponent melt bonding fibers. Further solidification possibilities are, for example, needling, water jet needling or the soaking or spraying of the nonwoven with liquid binders with subsequent drying.

Meltblown nonwovens consist of polymeric filaments. For the production of meltblown nonwovens for the filter material according to the invention, the meltblown process known among experts is used, as is described, for example, in Van A. Wente, "Superfine Thermoplastic Fibers", Industrial Engineering Chemistry, vol. 48, pp. 1342 to 1346. Suitable polymers are, for example, polyethylene terephthalate, polybutylene terephthalate, polyethyene naphtalate, polybutylene naphtalate, polyamide, polyphenylene sulfide and polyoelfins. Preferably, the typical fiber diameters are between 0.5 to 10 μm and particularly preferably between 0.5 to 3 μm. Depending on the requirements, additives such as, for example, hydrophilizing agents, hydrophobing agents, crystallization accelerators or dyes can be further admixed to the polymers.

Depending on the requirement, the surface of the meltblown nonwovens can be changed in its property by surface treatment methods, such as, for example, corona treatment or plasma treatment.

Spunbonded nonwovens also consist of polymeric filaments, the fiber diameters of which, however, are usually significantly larger than those of the meltblown fibers. Spunbonded nonwovens are produced in accordance with the spunbonded nonwoven process known among experts, as is described, for example, in patent specifications U.S. Pat. Nos. 4,340,563 A, 3,802,817 A, 3,855,046 A and 3,692,618 A. Polymers suitable for the spunbonded nonwoven process are, for example, polyethylene terephthalate, polybutylene terephthalate, polyethylene naphtalate, polybutylene naphtalate, polyamide, polyphenylene sulfide and polyolefins.

Foams are to be understood as all open cellular foams made of organic polymers. Due to their open cellular structure, they are air-permeable and suitable for a variety of different filtration tasks. The production of suitable foams is described, as an example, in citations U.S. Pat. No. 3,171,820 A, DE 1504551 A, DE 601435 A and GB 1111928 A.

Within the meaning of this invention, wet-laid nonwovens are all nonwovens that can be produced by means of the wet-laid processes for producing filter materials known among experts. The materials for the filter material according to the invention consist preferably of natural, synthetic, inorganic fibers or a mixture thereof. Examples of natural fibers are cellulose, cotton, wool and hemp, with the cellulose material used being wood-free and/or wood-containing cellulose of conifers and/or broadleaves, regenerated cellulose and fibrillated cellulose. Inorganic fibers are, for example, glass fibers, basalt fibers, quartz fibers and metal fibers. Suitable synthetic fibers are, for example, polyester fibers, polypropylene fibers, multicomponent fibers with different melting points of the individual components, polyamide fibers and polyacrylonitrile fibers. The titer of the synthetic fibers is typically 0.1 dtex to 8.0 dtex, particularly preferably 0.5 dtex to 5 dtex, and the cut length is typically 3 mm to 20 mm, particularly preferably 4 mm to 12 mm. The materials for the filter material according to the invention can consist to 100% of natural, synthetic or inorganic fibers, however any arbitrary mixture of these fiber types is also possible. Due to his knowledge and experience, the person skilled in the art knows how to specifically select the right composition depending on the required material properties. A material ply can consist of multiple layers which are generated and joined together either in a paper machine with a suitable headbox or from individual paper webs that consist of filter materials and are joined together in a separate operational step. The individual layers can be designed differently in terms of their properties.

In a preferred embodiment, the filter material according to the invention is a paper-based filter material. This means that the filter material in this embodiment consists of cellulose fibers and, optionally, additionally of synthetic fibers, in particular polyester fibers. The synthetic fibers, particularly the polyester fibers, preferably have 0.3 to 8.0 dtex and a cut length of 3 to 12 mm. According to a particularly preferred embodiment, the paper-based filter material according to the invention consists of cellulose fibers together with 0 to 50 wt. % polyester fibers having 0.3 to 8.0 dtex and a cut length of 3 to 12 mm relative to 100% of the non-impregnated filter material. In this embodiment, the filter material preferably has a grammage [weight per unit area] of 60 to 250 g/m$^2$, a thickness of 0.2 to 2.2 mm, an air permeability of 50 to 3000 l/m$^2$s and a porosity of 70 to 95%. The porosity is the ratio of the actual density of the filter medium to the average density of the fibers used.

In a further preferred embodiment, the filter material according to the invention consists of 5 to 25 wt. % melt bonding fibers having 0.5 to 8.0 dtex and a cut length of 3 to 12 mm and of 70 to 90 wt. % polyester fibers having 0.3 to 8.0 dtex and a cut length of 3 to 12 mm relative to 100% of the non-impregnated filter material. In this embodiment, the filter material preferably has a grammage of 30 to 300 g/m$^2$, a thickness of 0.2 to 2.2 mm, an air permeability of 50 to 3000 l/m$^2$s and a porosity of 70 to 95%.

The invention is not restricted to the specified embodiments. Within the scope of the invention, it is easily possible that the filter material according to the invention consists of multiple plies or layers. It is moreover also possible that one or more plies of other materials are provided in front of and/or behind the filter material according to the invention, provided the flame retardant effect is not, or at least not significantly, effected by this.

Hence, the filter material according to the invention can have, for example, a prefilter ply of a meltblown nonwoven, a spunbonded nonwoven, a dry-laid staple fiber nonwoven, a wet-laid nonwoven, a glass fiber nonwoven, a fabric or a foam. The prefilter ply is on the inflow side of the filter material. The expression inflow side thereby denotes the side of the filter material from which the mixture to be filtered is conducted through the filter material.

In a preferred embodiment, the prefilter ply of the filter material according to the invention consists of a meltblown nonwoven having a grammage of 8 g/m$^2$ to 120 g/m$^2$, a thickness of 0.1 mm to 1.5 mm and an air permeability of 1000 l/m$^2$s to 5000 l/m$^2$s.

The filter material according to the invention is impregnated on one side with a binding agent such that the opposite side is free from binding agent. In this application, the binding agent is sometimes also referred to as "impregnating agent". The impregnated side is understood to be that part of the filter material which is delimited by the surface of the filter material, where the binding agent is applied. The opposite side denotes the part of the filter material, which is delimited by a surface that is opposite the surface of the impregnated side and does not contain any binding agent. Preferably, the filter material according to the invention is extensive (taking up a broad but not thick surface), i.e. it has two opposite surfaces which particularly preferably are arranged parallel to each other.

The binding agent is applied by impregnation onto the filter material and penetrates at least one part of the filter material. The impregnated surface of the filter material remains permeable especially to gases.

If the filter material according to the invention has a more open side and a denser side, the impregnation is preferably applied onto the denser side. The denser side differs from the more open side by a smaller average pore size, with the average pore size of the denser side preferably being at least 5%, more preferably at least 10% and particularly preferably at least 20% smaller than that of the more open side.

The substances known for filter materials are used as binding agents, for example phenolic resins or epoxy resins from alcoholic solutions, however also aqueous dispersions from e.g. acrylates, styrene butadiene, polyvinyl acetates, polyurethanes, phenolic resins or mixtures thereof. Another possible class of binding agents are aqueous solutions of e.g. polyvinyl alcohol, melamine resin or urea-formaldehyde resin. In addition to the liquid binding agents, solid, powdery binders of thermoplastic polymers can also be used.

Depending on requirements, different excipients such as hydrophilic agents, hydrophobing agents or dyes can also be admixed to the binding agent.

Impregnation is performed in accordance with the known prior art, e.g. by spraying, roller application, foam application or dusting. The typical proportion of the dry impregnating agent to the total weight of the filter material is 0.5 to 50 wt. %, preferably 5 to 35 wt. %. Within the meaning of the invention, the proportion of the dry impregnating agent relates to the proportion of the impregnating agent in the filter material, which was dried at 100° C. in a circulation air drying cabinet for 30 minutes.

The non-impregnated side of the filter material according to the invention contains a halogen-free and boron-free flame protection means. The non-impregnated side constitutes the part of the filter material, which is delimited by a surface which is opposite the surface of the impregnated side. Preferably, the impregnated surface and the non-impregnated surface are arranged parallel to each other in the filter material according to the invention. Optionally, the impregnated side can also contain a halogen-free and boron-free flame protection means. Thus, according to a preferred embodiment of the filter material according to the invention, only the non-impregnated side contains a halogen-free and boron-free flame protection means.

The halogen-free and boron-free flame protection means can comprise a nitrogenous component and/or a phosphorous component. Examples of nitrogenous components are urea, urea compounds and guanidine compounds. Examples of phosphorous components are phosphoric acid esters and salts thereof, phosphonic acid esters and salts thereof, phosphinic acid esters (phosphoric (I) acid esters) and salts thereof (e.g. 9,10-dihydro-9-oxa-10-phosphaphenanthrene 10-oxide and derivatives thereof), phosphates and polyphosphates, with phosphoric acid esters and the salts thereof as well as DOPO and the derivatives thereof being preferred.

With respect to the dust storage capacity of the filter material, it is advantageous to fix the flame protection means directly onto the fiber, thus without a binding agent. Preferably, this is realized by binding the flame protection means to the surface of the fiber, where what is meant by the fiber surface is the surface of the fibers contained in the filter material, or by means of a poorly soluble, halogen-free and boron-free flame protection means. This results in the advantage that the halogen-free and boron-free flame protection means cannot be washed out.

Within the meaning of the present application, poorly soluble means that the solubility of the flame protection means in distilled water of 20° C. is preferably no more than 3.5 wt. %, particularly preferably no more than 3.0 wt. % and very particularly preferably no more than 2.5 wt. %, relative to 100 wt. % of the sum from the weight of the water and the flame protection means.

Bonding can be realized by suitable reactive groups which are contained in the halogen-free and boron-free flame protection means, especially in the nitrogenous and/or phosphorous component of the flame protection means, and preferably the nitrogenous component comprises suitable reactive groups. Methylol- and/or aldehyde groups are, for example, suitable as reactive groups. Suitable nitrogenous components which contain the reactive groups are, for example, methylol urea, methylol-melamine-formaldehyde and conversion products of urea compounds, guanidine compounds or dicyandiamide with multi-functional compounds such as glyoxal or glutardialdehyde. In a solvent, for example methanol or water, the flame protection means can be sprayed onto the filter material as a solution or dispersion. During evaporation of the solvent, a bond is formed between the flame protection means and the fiber surface of the fibers contained in the filter material.

Preferably, in addition to the nitrogenous component with reactive groups, the halogen-free and boron-free flame protection means contains a phosphorous component. This phosphorous component can be selected from the group of phosphorous compounds such that it either reacts with the nitrogenous component into a poorly soluble compound or is inherently poorly soluble in water. The solubility of the poorly soluble, phosphorous component in distilled water of 20° C. is preferably no more than 3.5 wt. %, particularly preferably no more than 3.0 wt. % and very particularly preferably no more than 2.5 wt. %, relative to 100 wt. % of the sum of the weight of the water and the phosphorous component. Particularly preferably, the phosphorous component is selected from the group consisting of phosphoric acid esters and salts thereof, phosphonic acid esters and salts thereof and DOPO (9,10-dihydro-9-oxa-10-phosphaphenanthrene 10-oxide) and derivatives thereof.

The halogen-free and boron-free flame protection means can be applied in accordance with known prior art methods, for example by spraying, roller application, foam application or dusting. The typical proportion of the dry halogen-free and boron-free flame protection means to the total weight of the filter material is 0.5 to 50 wt. %, preferably 10 to 30 wt. %. Within the meaning of the invention, the proportion of the dry flame protection means relates to the proportion of the flame protection means in the filter material that was dried at 100° C. in a circulation air drying cabinet for 30 minutes.

Preferably, the filter material according to the invention has a grammage from 30 to 300 $g/m^2$, particularly preferably from 60 $g/m^2$ to 250 $g/m^2$ and very particularly preferably from 90 $g/m^2$ to 180 $g/m^2$. The thickness of the filter material according to the invention is preferably from 0.2 mm to 2.2 mm, particularly preferably from 0.4 mm to 1.5 mm and very particularly preferably from 0.45 mm to 1.0 mm. The thickness of the filter material according to the invention relates to the distance between the surface where the binding agent is applied and the opposite surface. Air permeability is preferably from 20 $l/m^2s$ to 3000 $l/m^2s$, especially preferably from 30 $l/m^2s$ to 1600 $l/m^2s$, particularly preferably from 50 $l/m^2s$ to 1000 $l/m^2s$ and very particularly preferably from 100 $l/m^2s$ to 500 $l/m^2s$. The porosity of the filter material according to the invention is preferably from 70% to 95% and particularly preferably from 75% to 90%. In the filter material according to the invention, the separation efficiency according to ISO 5011 is preferably at least 90%, more preferably at least 95% and very particularly preferably at least 99%. The dust storage capacity according to ISO 5011 is preferably at least 1.0 $g/200\ cm^3$, more preferably at least 1.5 $g/200\ cm^3$ and particularly preferably at least 2.0 $g/200\ cm^3$. The filter material according to the invention has preferably a flame retardancy according to DIN 53438 of at least F1 and at least K1. The washout resistance is preferably at least F1 and at least K1.

In a preferred embodiment of the invention, the filter material according to the invention has a grammage from 60 $g/m^2$ to 250 $g/m^2$, a thickness from 0.2 mm to 2.2 mm and an air permeability from 20 $l/m^2s$ to 3000 $l/m^2s$.

Test Methods

1) Prior to the determination of the separation efficiency and the dust storage capacity according to ISO 5011 as well as the washout resistance and the flame retardancy according to DIN 53438, the specimen are treated, i.e. cured, at 160°

C. in a circulation air drying cabinet for 10 minutes and afterwards are conditioned at 23° C. for 24 hours and at 50% relative humidity.

2) The testing of the grammage according to DIN EN ISO 536, the thickness according to DIN EN ISO 534, the air permeability according to DIN EN ISO 9237, the proportion of impregnating agent and of the porosity is performed on non-cured specimen which prior to measurement were conditioned at 23° C. for 24 hours and at 50% relative humidity.

Grammage according to DIN EN ISO 536

Thickness according to DIN EN ISO 534 having a contact pressure of 0.1 bar

Air permeability according to DIN EN ISO 9237 at a pressure difference of 200 Pa Separation efficiency and dust storage capacity according to ISO 5011, measured with test dust Iso fine at a specimen surface of 200 cm$^2$ and an inflow velocity of 12 cm/s.

An absolute filter "Glass-Microfiber-Disc Grade 227" of Munktell is disposed downstream of the specimen. Dusting is carried out at a dust concentration of 1000 mg/m$^3$ and is interrupted as soon as an end pressure of 3000 Pa is achieved.

Separation efficiency and dust storage capacity are calculated by the following formula:

$$\text{Separation efficiency in \%} = \frac{(P1 - P0)}{(P1 - P0) + (G1 - G0)} \times 100\%$$

$$\text{Dust storage capacity in g/200 cm}^3 = (P1 - P0) + (G1 - G0)$$

with
P0=weight of the specimen prior to dusting
P1=weight of the specimen after dusting
G0=weight of the absolute filter prior to dusting
G1=weight of the absolute filter after dusting Washout Resistance To determine the washout resistance of the halogen-free and boron-free flame protection means, the flame protected filter material is stored in deionized water at 23° C. for 24 h. After subsequent drying at 110° C. and conditioning at 23° C. and 50% relative humidity, the flame retardancy is determined according to DIN 53438, parts 2 and 3. In filter materials impregnated on one side with binding agents, flame treatment is performed on the binder-free side and in fully impregnated filter materials on the inflow side during the intended use.

Flame retardancy according to DIN 53438, part 2 and part 3. In filter materials impregnated on one side with binding agents, flame treatment is performed on the binder-free side and in fully impregnated filter materials on the inflow side during intended use.

Porosity is determined from the actual density of the filter medium and the average density of the fibers used:

Porosity=(1−density of the filter medium [g/cm$^3$]/ density of the fibers [g/cm$^3$])*100%

The proportion of the impregnating agent in a filter material is calculated according to the formula:

Proportion of impregnating agent in %=(FM Imp./ FM paper)*100% with FM Imp=mass of the dried impregnating agent per m$^2$ filter material and
FM paper=grammage of the impregnated filter material, the filter material, prior to determining the proportion of the impregnating agent, being dried at 100° C. in a circulation air drying cabinet for 30 minutes.

Example (Comparison)

A material web of 100% cellulose was produced in a paper machine according to the well-known method for paper production. This filter material had a grammage of 100 g/m$^2$, a thickness of 0.47 mm and an air permeability of 170 l/m$^2$s. In a separate working step, this filter material was fully impregnated with an impregnating agent containing an aqueous acrylic dispersion and a halogen-free and boron-free flame protection means. After drying, the filter material had a grammage of 134 g/m$^2$, a thickness of 0.48 mm, an air permeability of 150 l/m$^2$s and a resin content of 25%. This filter material is available under the designation L4-2i25HPF from Neenah Gessner GmbH, Bruckmühl. After that, the filter material was cured at 160° C. for 10 minutes. Based on the cured filter material, the flame retardancy before and after the washout test, the separation efficiency and the dust storage capacity were determined. Prior to the tests, the cured filter material was conditioned at 23° C. for 24 hours and at 50% relative humidity. The results are summarized in Table 1.

Example 2 (Comparison)

The material web from Example 1 was impregnated with the same impregnating agent and flame protection means as in Example 1, with the only difference being that the impregnating agent and the flame protection means were this time only applied on one side by roller application on the wire side of the filter material. After drying, the paper had a grammage of 134 g/m$^2$, a thickness of 0.51 mm, an air permeability of 164 l/m$^2$s and a resin content of 25%. Subsequently, the filter material was cured at 160° C. for 10 minutes. Based on the cured filter material, flame retardancy before and after the washout test, the separation efficiency and the dust storage capacity were determined Prior to the tests, the cured filter material was conditioned at 23° C. for 24 hours and at 50% relative humidity. The results are summarized in Table 1.

Example 3 (Invention)

A halogen-free and boron-free flame protection means according to the invention consisting of a solution of 12 g hydroxymethylurea and 27 g triphenylphosphate was sprayed in 100 g methanol on the non-impregnated, substantially resin-free side of the filter material from Example 2 impregnated on one side, and then dried. After drying, the filter material had a grammage of 144 g/m$^2$, a thickness of 0.51 mm, an air permeability of 162 l/m$^2$s. The application weight of the dried flame protection coating was 10 g/m$^2$. The filter material was then cured at 160° C. for 10 minutes to achieve a bond of the flame protection means with the fiber surface. Based on the cured filter material, the flame retardancy before and after the washing-out test was determined as well as the separation efficiency and the dust storage capacity. Prior to the tests, the cured filter material was conditioned at 23° C. for 24 hours and at 50% relative humidity. The results are summarized in Table 1.

TABLE 1

|  | Example 1 (Comparison) | Example 2 (Comparison) | Example 3 (Invention) |
|---|---|---|---|
| Separation efficiency | 99.93% | 99.84% | 99.86% |
| Dust storage capacity | 1.86 g/200 cm$^3$ | 2.57 g/200 cm$^3$ | 2.50 g/200 cm$^3$ |

TABLE 1-continued

|  | Example 1 (Comparison) | Example 2 (Comparison) | Example 3 (Invention) |
|---|---|---|---|
| Flame retardancy | F1/K1 | none | F1/K1 |
| Washout resistance | F1/K1 | none | F1/K1 |

As can be seen in table 1, the same flame retardancy is achieved with the filter material according to the invention (example 3) as with the filter material according to the previous prior art (example 1). The advantage of the filter material according to the invention is a significantly higher service life with the same separation efficiency compared to example 1. It can, moreover, be seen from the comparison of examples 2 and 3 that the filter material according to the invention still has the good dust storage capacity of the one-sided impregnated filter material (Example 2) even after the spraying of the flame protection means, and thereby has a flame-retardant effect.

The invention claimed is:

1. A filter material comprising at least one material selected from the group consisting of wet-laid nonwovens, dry-laid nonwovens and foams, wherein one side is impregnated with a binding agent throughout the entire surface area of the one side of the filter material, and an opposite side of the filter material is without a binding agent, wherein the opposite side contains a halogen-free and boron-free flame protection means, and wherein the filter material has a separation efficiency of at least 90% and a dust storage capacity of at least 1.0 g/200 cm$^3$.

2. The filter material according to claim 1, wherein the halogen-free and boron-free flame protection means is bound to the fibers contained in the filter material.

3. The filter material according to claim 1 wherein the halogen-free and boron-free flame protection means is poorly soluble in water.

4. The filter material according to claim 2, wherein the halogen-free and boron-free flame protection means comprises at least one nitrogenous component and optionally one phosphorous component, the nitrogenous component being bound to the fibers.

5. The filter material according to claim 1, wherein the binding agent contains at least one member from the group consisting of phenolic resin and epoxy resin, melamine resin, urea-formaldehyde resin and thermoplastic polymer.

6. The filter material according to claim 1, wherein the one side impregnated with a binding agent contains a halogen-free and boron-free flame protection means.

7. The filter material according to claim 1, wherein the filter material has a grammage of 60 g/m$^2$ to 250 g/m$^2$.

8. The filter material according to claim 1, wherein the filter material has a thickness of 0.2 mm to 2.2 mm.

9. The filter material according to claim 1, wherein the filter material has an air permeability of 50 l/m$^2$s to 3000 l/m$^2$s.

10. The filter material according to claim 1, wherein the filter material has a flame-retardant effect according to DIN 53438 of at least K1 and at least F1.

11. The filter material according to claim 1, wherein the filter material has a washout resistance of at least K1 and at least F1.

12. The filter material according to claim 1, wherein the filter material has a prefilter ply on the inflow side.

13. The filter material according to claim 12, wherein the prefilter ply comprises a meltblown nonwoven, a spun-bonded nonwoven, a dry-laid staple fiber nonwoven, a wet-laid nonwoven, a glass fiber nonwoven, a fabric or a foam.

14. A filter element comprising a filter material according to claim 1.

15. The filter material according to claim 1, wherein said filter material is for gas filtration.

16. The filter material of claim 1, wherein the filter material is a monolayer.

17. The filter material of claim 1, wherein other materials are provided in front of and/or behind the filter material.

18. The filter material of claim 16, wherein other materials are provided in front of and/or behind the filter material.

19. A filter material comprising at least one material selected from the group consisting of wet-laid nonwovens, dry-laid nonwovens and foams, wherein one side is impregnated with a binding agent throughout the entire surface area of the one side of the filter material, and an opposite side of the filter material is without a binding agent, wherein the opposite side contains a halogen-free and boron-free flame protection means, wherein the filter material is a monolayer, and wherein the filter material has a separation efficiency of at least 90% and a dust storage capacity of at least 1.0 g/200 cm$^3$.

20. A filter element comprising the filter material of claim 19.

* * * * *